No. 779,984.                                              Patented January 10, 1905.

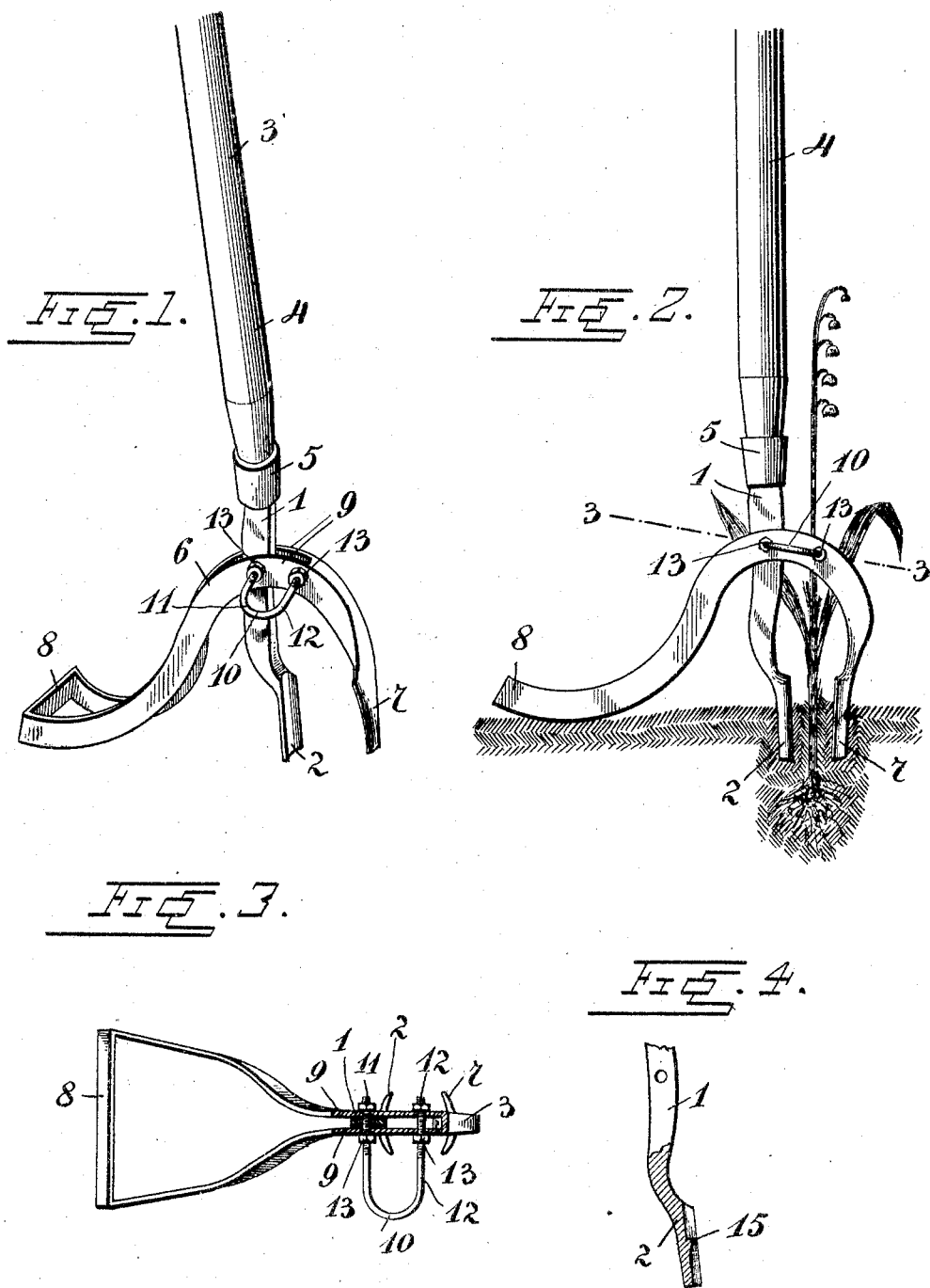

UNITED STATES PATENT OFFICE.

MELVIN PAUL ALLEN, OF OTTAWA, KANSAS.

NURSERY-STOCK PULLER.

SPECIFICATION forming part of Letters Patent No. 779,984, dated January 10, 1905.

Application filed July 7, 1904. Serial No. 215,670.

*To all whom it may concern:*

Be it known that I, MELVIN PAUL ALLEN, a citizen of the United States, residing at Ottawa, in the county of Franklin and State of Kansas, have invented certain new and useful Improvements in Nursery-Stock Pullers; and I do declare the following to be a full, clear, and exact description of the invention, such as will enable others skilled in the art to which it appertains to make and use the same.

My invention relates to improvements in devices for pulling or extracting dandelions, plantains, dock, vines, bushes, nursery trees or stock, or any other vegetation.

The object of my invention is to improve and simplify the construction and operation of devices of this character, and thereby render them more durable and efficient in use and less expensive to manufacture.

With this and other objects in view the invention consists of certain novel features of construction, combination, and arrangement of parts, as will be more fully described, and particularly pointed out in the appended claims.

In the accompanying drawings, Figure 1 is a perspective view of my improved pulling or extracting device. Fig. 2 is a side elevation of the same, showing it in operation. Fig. 3 is a horizontal sectional view taken on the line 3 3 of Fig. 2. Fig. 4 is a detail sectional view through a slightly-modified form of jaw.

Referring to the drawings by numeral, 1 denotes a lever having at its lower end a jaw 2 and at its upper end a handle extension 3. Said jaw 2 is preferably formed integral with the lever, as shown, and the handle 3, while it may be of any desired construction, is here shown in the form of a wooden bar 4, secured in a metallic socket 5, provided upon the upper portion of the lever 1. Pivotally mounted upon the lever 1 at a suitable distance above its jaw 2 is a swinging arm 6, having at one of its ends a jaw 7, adapted to coact with said jaw 2, and at its opposite end a foot 8. The said arm 6, which may be of any suitable form or construction and pivoted to the lever in any desired manner, is preferably S-shaped in form and is constructed of a single strip of iron, steel, or other metal, which is bent upon itself, as clearly shown in Fig. 3, to form the foot 8 and has its ends welded or otherwise united to form the jaw 7.

The lever 1, as illustrated in the drawings, passes between the spaced portions 9 of the arm 6 and is pivotally secured thereto by a fulcrum-bolt 10, which passes through the alining openings in said arm and lever. Said fulcrum 10 is preferably in the form of a U-shaped bolt, one end, 11, of which forms the fulcrum for said arm, and its other end, 12, passes through an opening formed in the outer or forward portion of the arm 6. The ends of said bolt are screw-threaded to receive nuts 13, and the body or curved portion of the bolt extends laterally upon either side of the device, as desired, to form a foothold or foot-rest, by means of which the jaws 2 and 7 may be readily forced into the ground or moved toward or from each other to adjust them upon the object desired to be removed from the ground. It will be seen that when the foot of the operator is placed upon the end 11 of the bolt 10 the jaw 2 or both jaws 2 and 7 may be forced into the ground and that when the operator presses his foot downwardly upon the end 12 of said bolt the jaw 7 of the arm 6 will be swung toward the jaw 2, the foot portion 8 of said arm being of greater weight than its jaw portion 7, so that said jaws are normally held in their open position.

The jaws 2 and 7 may be of any desired form of construction; but I preferably make them as clearly shown in Fig. 1. Each comprises a straight longitudinally-extending plate or body portion, which is curved transversely and which may be tapered slightly to form a spade or shovel. Said jaws oppose each other, so that they are adapted to receive the stalk of the plant or weed, bush, or other vegetation between them. As shown in Fig. 2, the jaws when the tool is being used are forced down into the ground a short distance from each side of the stalk of the plant or the like to be removed, so that there remains a small quantity of earth between the stalk and jaws, which forms a cushion to prevent the bruising of the stalk or the plant.

If desired, the jaws 2 and the adjacent portions of the lever 1 and arm 6 may be covered with cloth, rubber, or other cushioning material to prevent injury to the plants, bushes, or trees which are removed. When no cushioning material is used upon the lever and arm, I preferably finish and polish them, so as to leave no sharp edges to scrape or otherwise injure the skin or bark of young trees, shrubs, and the like when it is desired to replant them.

When the device is to be used for pulling weeds, the inner face of the jaws may be ribbed transversely or longitudinally, as desired, or said jaws may be formed with corrugations running in either direction. In Fig. 4 of the drawings I have shown one of the jaws formed upon its inner face with a transversely-extending rib 15, which is preferably provided when it is desired to use the device for extracting heavy weeds, bushes, or the like.

From the foregoing description, taken in connection with the accompanying drawings, the construction and operation of the invention will be readily understood without requiring a more extended explanation.

While I have shown the preferable embodiment of my invention, it will be understood that I do not wish to be limited to the precise construction herein set forth, since various changes in the form, proportion, and the minor details of construction may be resorted to without departing from the principle or sacrificing any of the advantages of this invention. For instance, the arm 6 instead of being constructed as shown may consist of a single bar pivoted upon either side of the lever or in an opening or bifurcated portion of said lever, or the jaws 2 and 7 instead of being integral with the lever 1 and arm 6, as shown, may be detachably connected thereto, so that different forms of jaws may be provided. If desired, a stop-pin may be provided upon the lever 1 to limit the opening of the jaws 2 and 7, and if so desired the open foot portion 8 may be covered by a sheet of metal or other material to prevent the foot 8 from sinking into the ground when the device is being used.

Having thus fully described my invention, what I claim as new, and desire to secure by Letters Patent, is—

1. A device of the class described, comprising a lever having a jaw upon its lower end, an arm pivotally mounted intermediate its ends upon said lever and having a foot at one end and a jaw at its opposite end, adapted to coact with the jaw upon said lever, and a fulcrum or pivot for said arm, having an extension to form a foothold whereby said jaws may be readily forced into the ground, substantially as described.

2. A device of the class described comprising a lever having a jaw upon its lower end, an arm pivotally mounted intermediate its ends upon said lever and having a foot at one end and a jaw at its other end adapted to coact with the jaw upon said lever, and a pivot connection for said arm, having a lateral extension whereby said jaws may be readily forced into the ground or the jaw upon said arm moved toward or from the jaw upon said lever.

3. In a device of the class described, a lever having a jaw, an arm having a jaw, and a U-shaped body having one end passed through said arm and lever to pivotally connect them together, and its other end secured to said arm, substantially as described.

In testimony whereof I have hereunto set my hand in presence of two subscribing witnesses.

MELVIN PAUL ALLEN.

Witnesses:
JOHN NELSON,
HENRY L. STONEHILL.